United States Patent [19]

Viertel

[11] Patent Number: 5,727,837
[45] Date of Patent: Mar. 17, 1998

[54] MULTI-PART SUN VISOR BODY FOR USE IN A VEHICLE

[75] Inventor: Lorthar Viertel, Altforweiler, Germany

[73] Assignee: Becker Group Europe GmbH, Wuppertal, Germany

[21] Appl. No.: 507,825

[22] Filed: Jul. 27, 1995

[30] Foreign Application Priority Data

Aug. 2, 1994 [DE] Germany .................. 44 27 279.0

[51] Int. Cl.$^6$ ............................................ B60J 3/02
[52] U.S. Cl. ................ 296/97.1; 296/97.5; 296/97.12
[58] Field of Search ........................ 296/97.1, 97.9, 296/97.12, 97.13, 97.5

[56] References Cited

U.S. PATENT DOCUMENTS 4,794,497 12/1988 Jonsas et al. ..................... 362/143
5,374,097 12/1994 George et al. ..................... 296/97.9

FOREIGN PATENT DOCUMENTS 0402586 12/1990 European Pat. Off. .
3614481 11/1987 Germany .
1354485 5/1974 United Kingdom ............ 296/97.12

OTHER PUBLICATIONS

European Search Report dated 10 Jan. 1996.

*Primary Examiner*—David M. Mitchell
*Attorney, Agent, or Firm*—Brinks Hofer Gilson & Lione

[57] ABSTRACT

In a vehicle sun visor, the sun visor body includes a main foamed plastic body panel having a recess in one surface thereof and a separate injection molded plastic carrier plate fitted into the recess, the recess being shaped for receiving the carrier plate. The carrier plate being smaller in size than the main body panel. The carrier plate being generally U-shaped, including one arm on which the bearing region for the sun visor shaft is supported and a spring for the detenting of the sun visor shaft is supported and including another arm with an end support pin for supporting the sun visor body in the vehicle. A recess in the carrier plate for receiving a mirror or a ticket clip.

27 Claims, 8 Drawing Sheets

MULTI-PART SUN VISOR BODY FOR USE IN A VEHICLE

BACKGROUND OF THE INVENTION

The invention relates to a sun visor for use in a vehicle having a sun visor body supported by a sun visor shaft, a spring which presses against the shaft and an end support pin away from the shaft. In particular, the invention concerns a sun visor body of attached main parts.

Vehicle sun visors of this type are described in numerous publications and are widely known through extensive use. Although this type of sun visor is standard vehicle equipment, no system exists with which customer requests in regard to equipment levels on the sun visor could be realized in a cost favorable fashion.

SUMMARY OF THE INVENTION

The object of the present invention is thus to make available a sun visor comprising only a few standard components, simply and economically produced, which can be assembled in modules, wherein regardless of whether an inexpensive, a medium class or a luxury version visor is desired, it is possible to use defined basic elements. Moreover, the sun visor should have an attractive appearance, a high degree of functional reliability, low weight and only minimum thickness.

Based on this object, the sun visor of the invention comprises a padding panel comprised of expanded plastic and a carrier plate comprised of an injection molded plastic part which is permanently attached to one face of the padding panel. The carrier plate has a substantially smaller circumference or peripheral shape than the padding panel. The plate is formed with a bearing region for receiving the sun visor support shaft, a bearing mount for the spring that resists swiveling of the visor body around the shaft, an end support pin away from the shaft and a mounting recess for a mirror or ticket clip.

Considerable advantages result from the invention. The padding panel need not be manufactured to be particularly stiff and intrinsically stable because the carrier plate satisfies the stabilizing function. This avoids the need to embed stabilization or reinforcement elements in the padding panel, and that panel can be made with relatively thin walls. The padding panel, can be made of any materials that are normally used to manufacture sun visors, including those with skin forming properties, and the materials may if required also be dyed. The use of expanded polypropylene is preferable due to its good recycling capacities.

The carrier plate is preferably made of polypropylene. It assumes the stabilization function and retains various functional parts. Nonetheless, it is a particularly simple and inexpensive part to manufacture. It can be comprised of a colored plastic material or may be painted in any desired color. In the lowest cost version, the sun visor comprises the padding panel and carrier plate components together with the functional elements, i.e. the sun visor shaft, spring and end support axis pin.

The sun visor is sufficient to fully satisfy its function of offering effective protection against disturbing and/or dazzling sunlight. The simple sun visor can easily be upgraded by including an additional functional element in the mounting recess which is provided for this purpose in the carrier plate. This additional functional element can optionally be a ticket clip to hold parking receipts, notes or the like, or a mirror which can serve as a makeup mirror.

To avoid protruding areas on the sun visor, the padding panel can have a depression in its face oriented toward the carrier plate, which depression corresponds to the circumference and thickness measurements of the carrier plate. The carrier plate may then be fitted exactly into this depression so that the sun visor body exhibits smooth external contours. The depression can be created when foaming the padding panel or can also be made later by compacting the material, possibly using thermal means, wherein compaction offers the advantage of increased stability.

The carrier plate can advantageously have a circumferential lip formed in place at its free edge which is seated against the padding panel and the lip may also be fitted with studs distributed along its edge to engage the padding material. The lip makes the carrier plate stiffer particularly in regard to torsion, which allows for a relatively thin wall thickness. The studs make a dependable connection between the padding panel and the carrier plate wherein vibratory or ultrasonic welding are preferably used.

A mirror can be held in the mounting recess in various ways, e.g. with an adhesive. Preferably however, a mirror held in a plastic frame is located in the mounting recess at the carrier plate. The plastic frame is in turn held on the carrier plate by a weld. The plastic frame protects the mirror during storage and shipping, which can be important, particularly for glass mirrors.

Using a plastic frame for the edge of the mirror is, however, sensible because it offers the option of hinging a cover flap on it in accordance with a further refinement of the invention. With such a cover flap, which is often requested, the papers held with a ticket clip can be concealed in the same way as a mirror when not in use. The hinging of the cover flap on the plastic frame can, for example, be effected as shown in DE-A-39 36 350.

In a further embodiment of the invention, the carrier plate includes at least one window like opening which can be closed by a cover plate, and the padding panel in the area behind this opening includes a cut-out to accept a constructional element. The cover element can optionally be a cover plate fitted with detent tabs for clip mounting or a plate made of translucent material fitted with detent tabs for clip mounting. The latter option may be considered when, in accordance with an advantageous further refinement of the invention, provision is made for an electrical illumination feature to be located at the carrier plate. That includes at least one tubular lamp located behind the cover, which is there made of translucent material, and includes contact elements, conductor wires and a switch. The electrical power supply for the illumination feature is from the vehicle electrical system. The power feed can here be effected in a known fashion via the sun visor shaft and/or via the end support pin, for example in a manner as is shown in DE-A-41 18 913, DE-A-40 28 939, DE-A27 59 796 or DE-A-27 03 447.

The padding panel which determines the circumferential shape of the sun visor body and which also assumes an impact absorbing function can, in accordance with a further feature of the invention, comprise an envelope made of plastic film, textile material or also leather cuttings.

Using the basic elements, i.e. the padding panel and the carrier plate, it is possible to manufacture a sun visor body which uses no additional functional components (first embodiment), which uses one additional functional component in the form of a ticket clip (second embodiment), which uses an additional functional component in the form of a mirror (third embodiment), which includes a mirror in addition to a mirror frame (fourth embodiment), which uses a mirror, a mirror frame and a cover flap (fifth embodiment), which is equipped with an illumination feature (sixth embodiment) and which in each embodiment can be fashioned with or without an envelope enclosing the padding panel. The padding panel and carrier plate must, however, be manufactured and maintained in storage separately for the driver and passenger side of a vehicle, i.e. in left-hand and right-hand versions.

The end support axis pin can be injection molded with the one-piece carrier plate. In view of the fact that a power feed to the illumination feature which may be provided may be via the end support axis pin, it is advisable that the end support axis pin be a separate component held on the carrier plate by a weld, with at least one contact element and one conductor wire leading to the illumination feature from the pin.

In accordance with an embodiment previously mentioned, a cover flap can be hinged to a mirror frame. It is, however, also possible in a further refinement of the invention to make provisions for a cover flap to be located at the cover plate to form above the mounting recess in the carrier plate a slot-like opening corresponding in length to the width of the cover flap, with downwardly extensions at the end of the slot, through which the cover flap can be inserted so that the projecting hinge pins injection molded to the upper edge of the cover flap engage by clip action with bearing blocks injected molded onto the rear of the carrier plate, and wherein over-center segments are integrated on the cover flap and engage with springs held at the carrier plate in order to keep the cover flap in the closed or in the opened position. It is conceivable that a separate different carrier plate be made available for this embodiment although the possibility also exists to close the slot opening with a cover element if no cover flap is desired or if a cover flap hinged to the mirror frame is to be provided.

The carrier plate preferably has an approximately U-shaped design with two arms and a web joining them, wherein the bearing region for the sun visor shaft and the bearing mount for the spring are located at the free end section of one of the arms of the plate, and the end support axis pin is located at the free end section of the other arm and wherein the web of the plate includes the mounting recess and potentially the slot opening and potentially the minimum of one window-like opening. This design of the carrier plate lends the sun visor body a particularly attractive appearance and a modern, casual design which can be further emphasized by selecting a color complementary to that of the padding panel.

The carrier plate further preferably includes an extension web located approximately at the center and extending to near the lower edge of the padding panel and which is provided with ridging as a grip area.

The mounting recess in the carrier plate can be formed with the bottom closed or, in accordance with a further embodiment of the invention, with a mirror opening and at its circumference a mounting frame for the mirror in order to allow mounting of the mirror from the rear of the carrier panel, wherein the mirror is held in place by means of clip tabs molded onto the mounting frame.

It is also possible in the interest of improved convenience that the lower edge of the mounting recess make a transition into a fingertip recess to facilitate operating the cover flap.

A further embodiment of the invention may comprise an extension angled toward the rear, and molded onto the upper edge of the cover flap, which interacts with a web molded onto the carrier plate by means of a film hinge in such a way that when the cover flap is swung from the open into the closed position and vice versa the switch button of a microswitch attached above the web on the rear of the carrier plate is actuated in order to interrupt or complete the power feed to the illumination feature.

In accordance with the description of the system it has been achieved that by assembling various defined basic elements, different design variants can be manufactured, adapted to customer wishes.

The invention is based essentially on there being an identical padding panel for the left-hand and right-hand sides as well as one each left-hand and right-hand carrier plate for the standard and deluxe versions of the sun visor.

The invention also involves the ability to do without foaming around a stabilizing frame which, for example, has the advantage that thinner but good quality visor thicknesses can be achieved, that cycling times are reduced in expanded polypropylene visor body manufacturing and even that fully automatic manufacturing using multiple-cavity molds is conceivable since the insertion phase (handling) is eliminated and thus a considerable contribution to cost reduction can be realized.

Contemporary systems have relatively high requirements as to operating media and thus are cost intensive, imply great logistical effort, in some cases quality problems since, depending on the sun visor design and model, separate complete tooling sets and testing equipment etc. have to be made up. In regard to recycling capabilities, too, the new solution offers an interesting alternative to known systems.

Other objects and features of the invention are described below by way of example on the basis of the attached drawings.

DESCRIPTION OF THE PREFERRED EMBODIMENTS

FIGS. 1 to 8 show a padding panel 1 preferably manufactured from expanded polypropylene. On the one face, it has localized recesses 21 with dimensions analogous to those of the carrier plate 2, shaped and sized to accept the carrier plate 2 exactly in shape and fit. The padding panel 1 may possibly be enclosed and welded in an enveloping material 20, which due to recycling considerations, may preferably be thermal polyolefin film. The carrier plate 2 is an injection molded part made of polypropylene, wherein the surface property and color can be taken into account in accordance with customer wishes.

Figures 1, 2, 3:
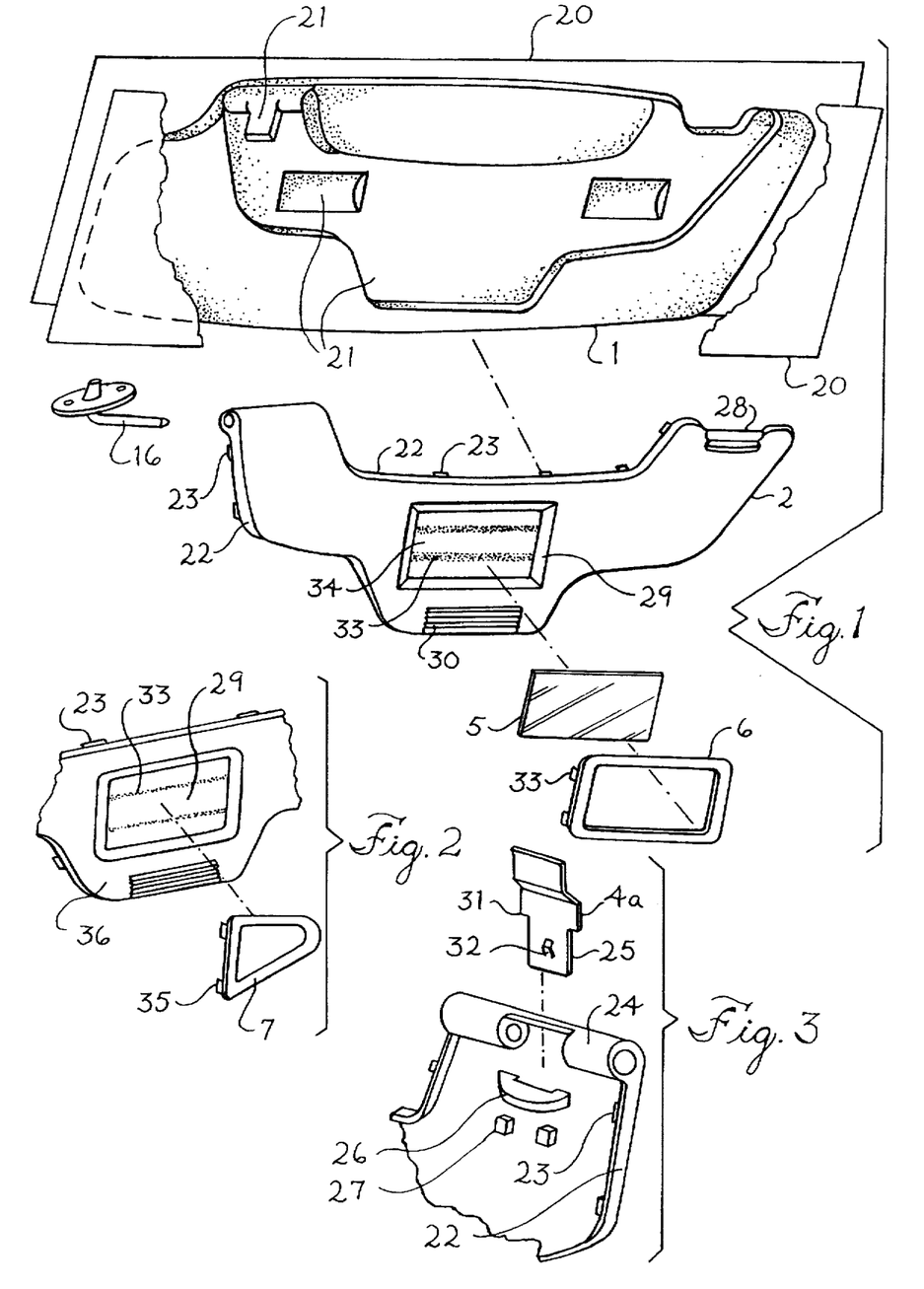
FIG. 1 shows a sun visor in an illustrative exploded view.
FIG. 2 shows a portion of the sun visor of FIG. 1 in a modified embodiment.
FIG. 3 shows a detail of the sun visor in FIG. 1.
Figures 4, 5, 6, 7, 8:
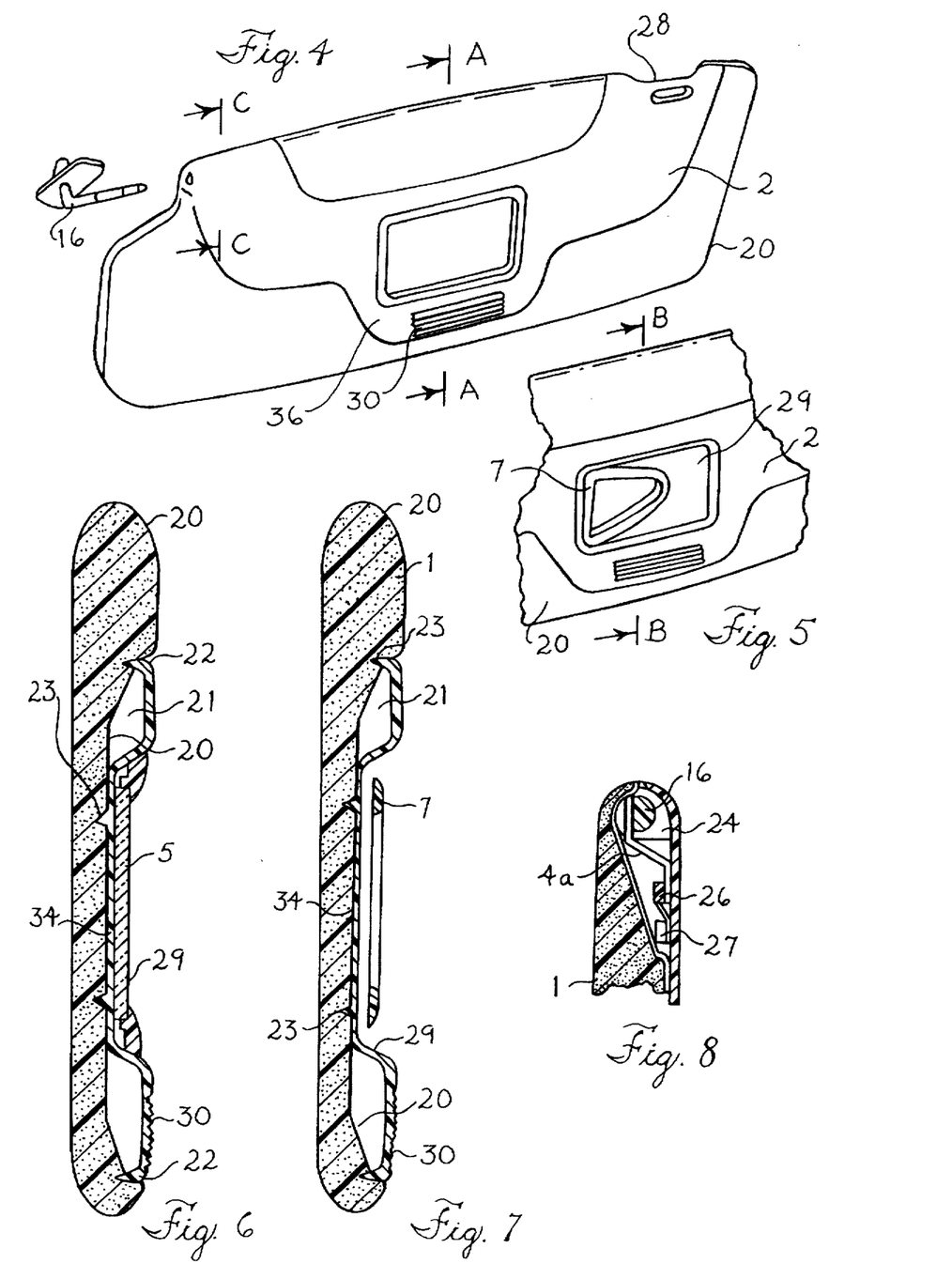
FIG. 4 shows an illustrative view of the sun visor in FIG. 1 in the assembled status with the exception of the sun visor shaft.
FIG. 5 shows the sun visor in an embodiment modified from FIG. 4.
FIG. 6 shows a section A—A as indicated in FIG. 5.
FIG. 7 shows a section B—B as indicated in FIG. 5.
FIG. 8 shows a section C—C as indicated in FIG. 4.

The structure of the standard carrier plate 2 is described below and can be premanufactured and stocked on the basis of the pre-planned variation option.

The carrier plate 2 incorporates an integral bearing region 24 at one top corner for receiving the sun visor shaft 16. The bearing region 24 is designed in such a way that a detent spring 4a to generate moments can be positioned and mounted there. The lower detent spring tongue 25 is inserted and retained in an injection molded pocket 26 provided for this purpose. The spring 4a has a positioning shoulder 31 and a locking tongue 32. Furthermore, two lateral nubs 27 on the plate beneath the region 24 secure the spring 4a against lateral shifting.

At the other end of the carrier plate 2 is an attached, round end support pin 28 serving for stabilizing and securing the visor in an appropriate end support block.

A mounting recess 29 is formed at the center of the outwardly facing side of the carrier plate 2 in which a mirror 5 with a frame 6 and without or with a cover can be installed in such a way that the frame 6 surrounds the mirror 5 and is joined with the carrier plate 2 by vibratory or ultrasonic welding at the raised welding tabs 33 in the bottom 34 of the recess 29. As an alternative to the mirror 5 with the frame 6, a ticket clip 7 may be provided which is also attached to the bottom 34 byway of vibratory welding or ultrasonic welding at the raised welding tabs 35.

For improved handling a ridged grip area 30 is provided at the lower area 36 of the center of the carrier plate 2.

After mounting of the components and pre-assembly, the carrier plate 2 is pressed into the recess 21 over which film may have been drawn. The upright, raised lip 22 on the edge of the plate is joined with the padding panel 1 by means of vibratory or ultrasonic welding. For this purpose there are raised welding tabs 23 located at the lip 22 and at the bottom 34. After this assembly process the sun visor shaft 16, made preferably of solid plastic for this standard visor, is inserted into the bearing area 24 formed for this purpose.

Figure 9:
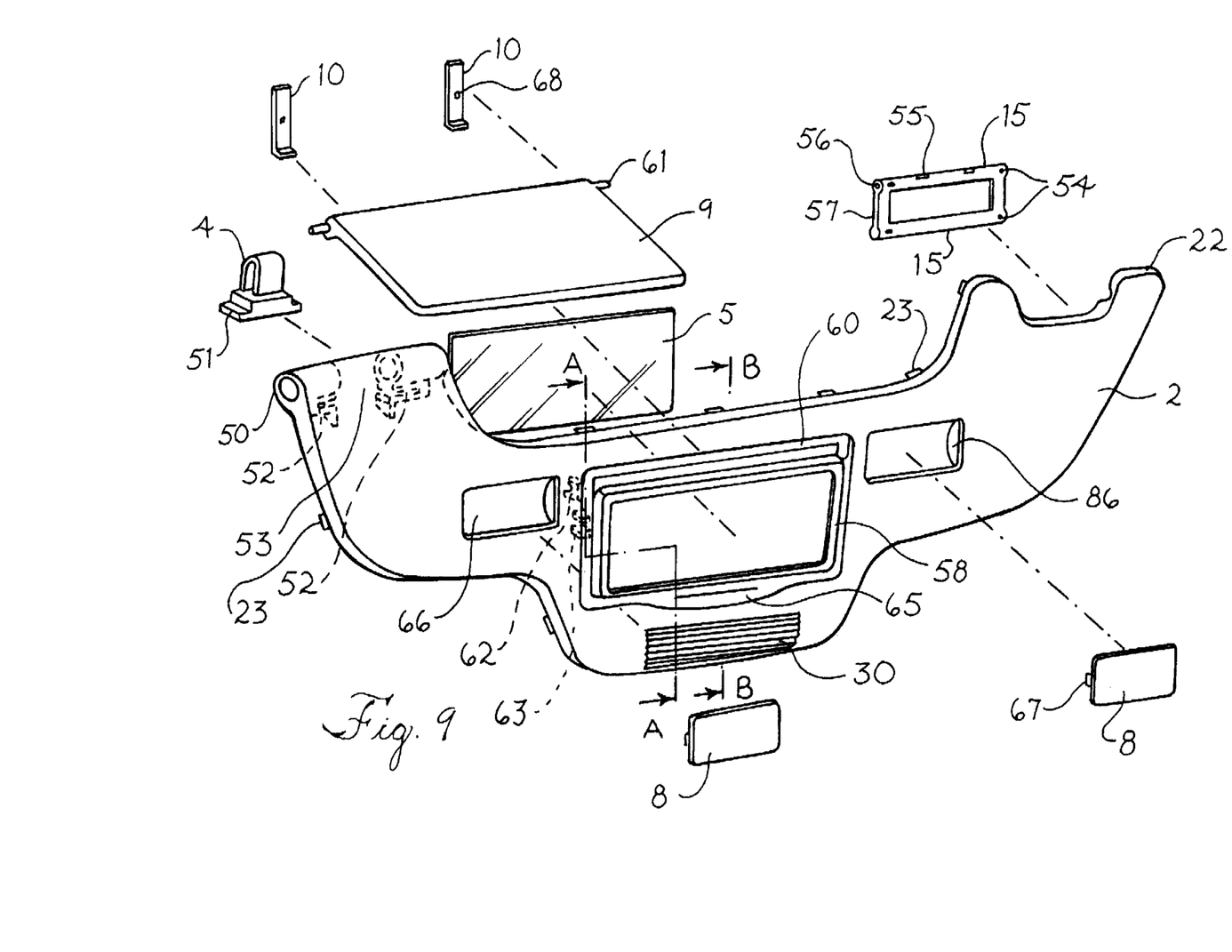
FIG. 9 shows a further refined sun visor modified from the embodiment of FIG. 1 in an illustrative exploded view without padding panel.
Figure 10:
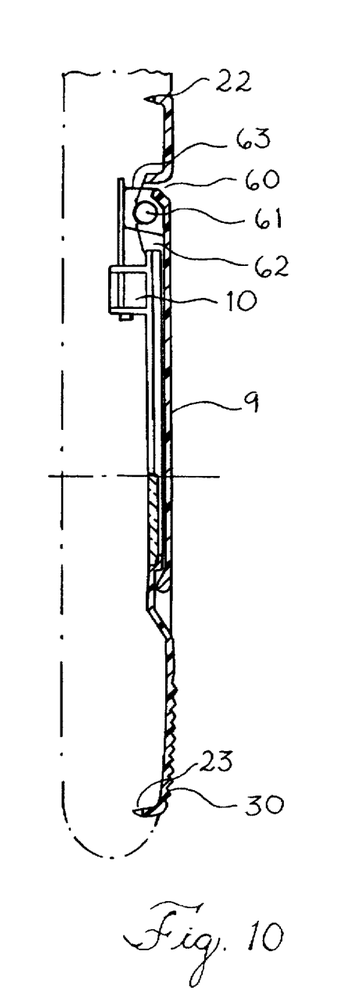
FIG. 10 shows a section A—A as indicated in FIG. 9.
Figure 11:
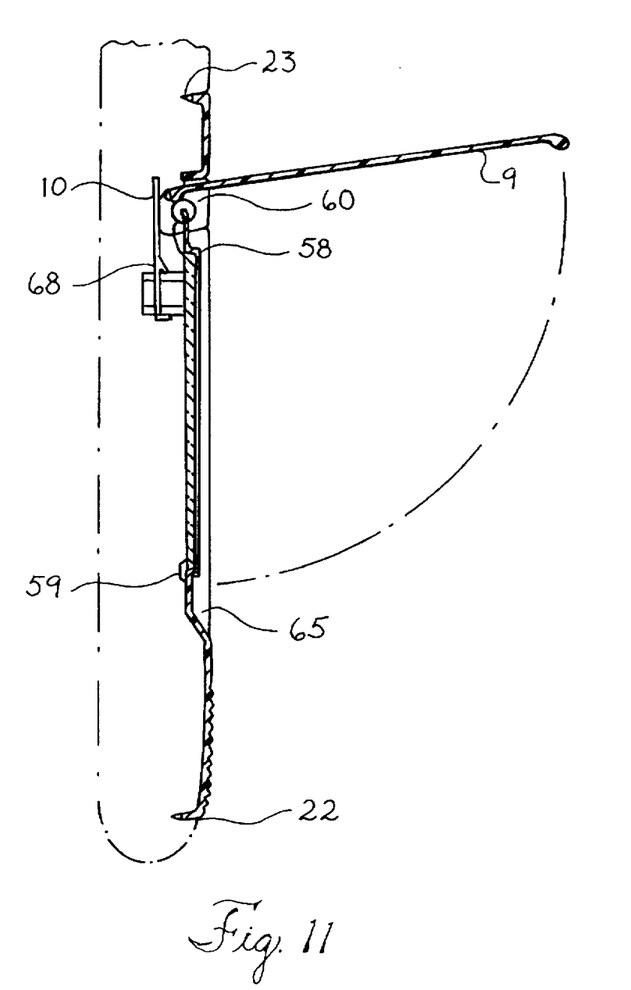
FIG. 11 shows a section B—B as indicated in FIG. 9.

The structure of the second embodiment of carrier plate 2 in FIGS. 9 to 11 is described below. As a consequence of the planned variation options, it can be premanufactured, inspected and stocked, as well. This carrier plate 2 has at the rear an attached bearing section 50 for receiving the sun visor shaft 16. The bearing section 50 is designed so that a detent spring 4 which is preassembled with a carrier foot 51 can be pressed into the groovelike mounts 52 at the left and right, below the bearing section 50. The bearing section 50 is interrupted at one central area 53 to accommodate the detent spring 4 so that it can carry out its function in regard to generating moments and causing the detent effect once the shaft has been mounted.

At the other end of the carrier plate 2 an end support pin 15, injection molded from polypropylene and color harmonized, is mounted and joined with the carrier plate 2 at the welding zones 54 provided for this purpose by means of vibratory or ultrasonic welding, etc. The end support pin 15 can, due to its shape and design, be used both for visor versions with electrical contacts as well as for those without. For this reason, openings 55, 56 are provided in an end support pin which allow mounting of the corresponding contacts which may be required. The second end support pin 15, joined by connector webs 57, has no openings and is used for non-illuminated versions.

A connection or arrangement for a mirror 5 with a cover flap is provided approximately at the center of the carrier plate 2 wherein a fingertip recess 65 is provided below this arrangement for improved operation of the cover flap 9. A ridged grip area 30 for improved operation of the sun visor is provided on the carrier plate 2 below the fingertip recess 65.

The mirror 5 is inserted from the rear in a carrier frame 58 formed in the carrier plate 2 and is held in place by locally injected clip tabs 59 in the carrier frame 58. Above the carrier frame 58 there is a continuous slot opening 60 for the mounting of the cover flap 9. The cover flap 9 is inserted from the back of the carrier plate 2 into the slot 60. The cover flap 9 has hinge pins 61 at the left and right at the upper edge. These are pressed in place in the mounting points 62 injected in place onto the rear of the carrier plate 2. In addition, there are two over-center segments 63 at the left and right at the cover flap 9. Due to their shape and in conjunction with the leaf springs 10, the segments 63 have a detent effect to hold the flap open or closed.

After the flap is mounted, the two leaf springs 10 with the protruding claws 68 are mounted, for which purpose the retaining webs 64 are provided at the left and right on the back of the carrier plate. The openings 66 to the left and right in the carrier plate 2—in the illuminated version provided with illumination windows—are closed in a positive fitting fashion with cover caps 8 injection molded from polypropylene. These cover caps 8 are retained expediently with detent tabs 67.

The embodiment of carrier plate 2 in FIGS. 12 to 18 has a bearing section 50 formed at the rear to accommodate the sun visor shaft 16. The bearing section 50 is formed as is described on the basis of FIGS. 9 to 11.

Figure 12:
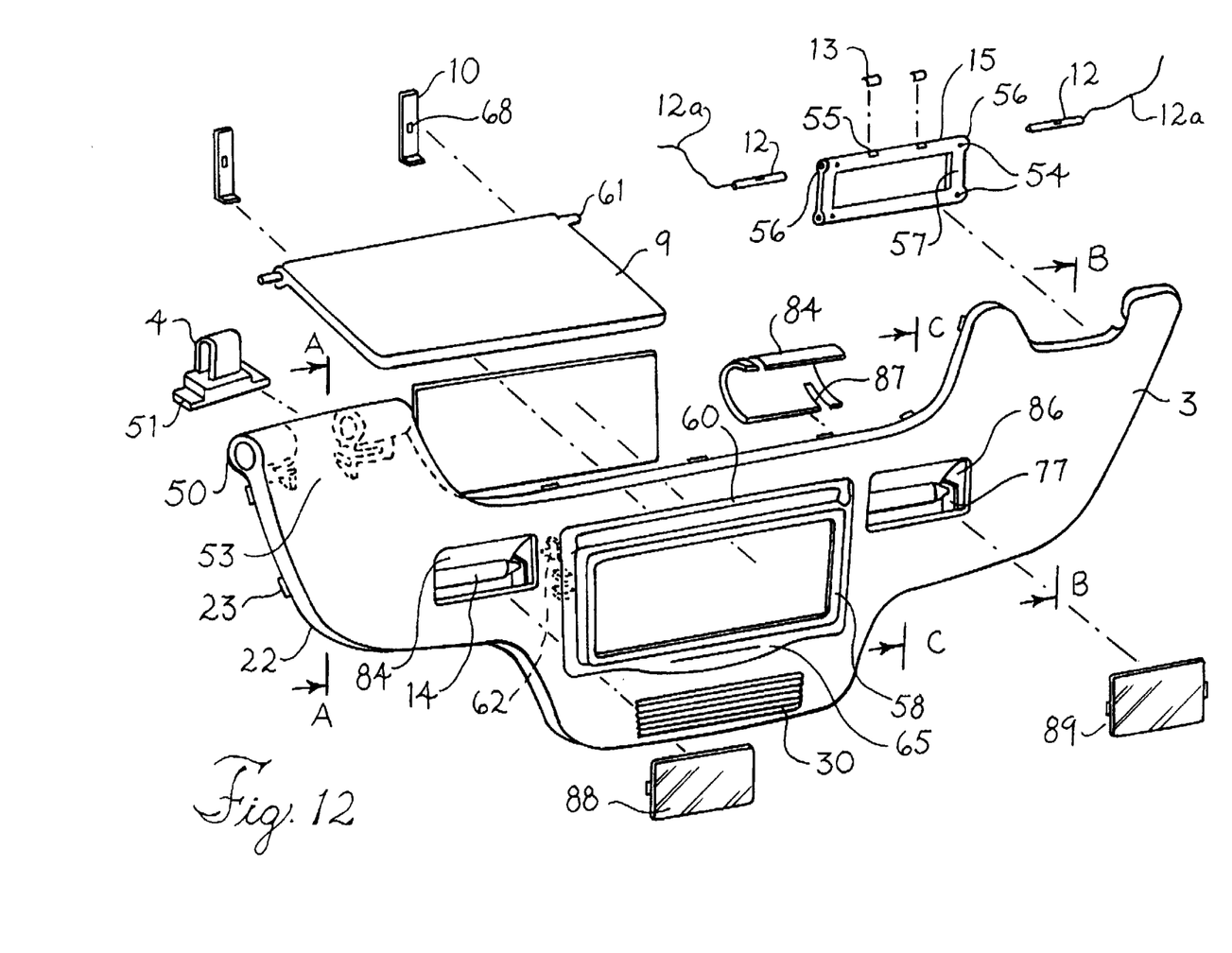
FIG. 12 shows a further expanded sun visor modified from the embodiments of FIGS. 1 and 9 in an illustrative exploded view without padding panel.
Figure 13:
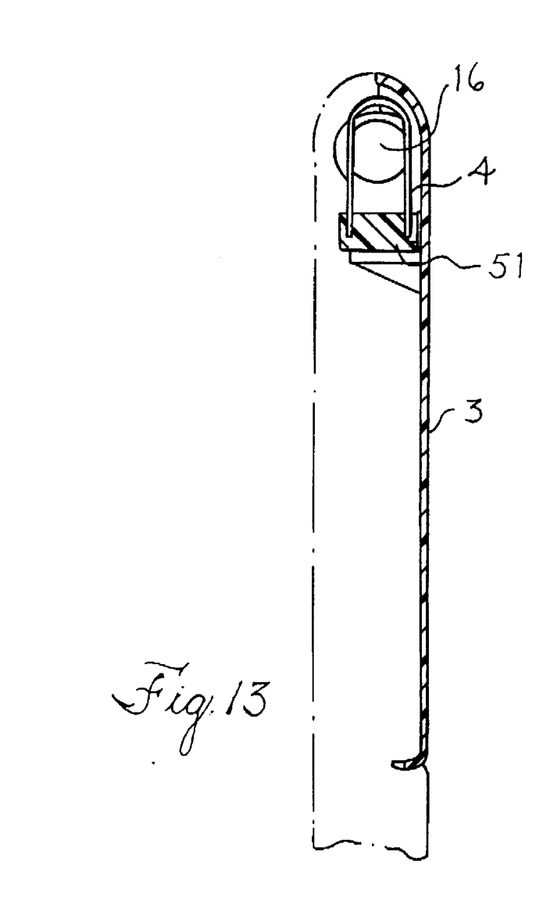
FIG. 13 shows a section A—A as indicated in FIG. 12.
Figure 14:
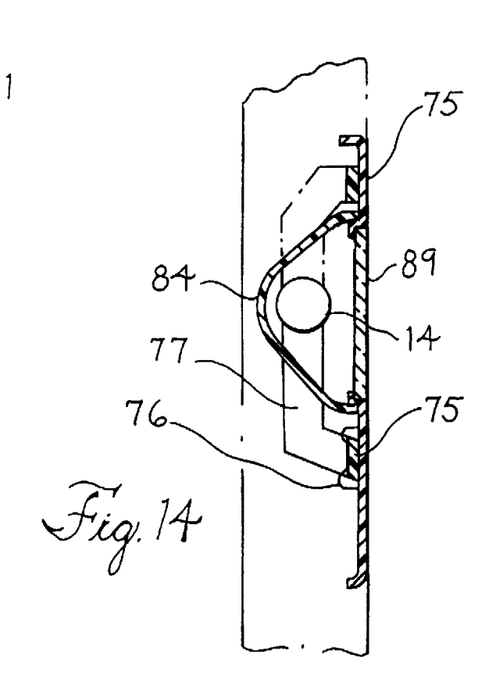
FIG. 14 shows a section B—B as indicated in FIG. 12.
Figure 15:
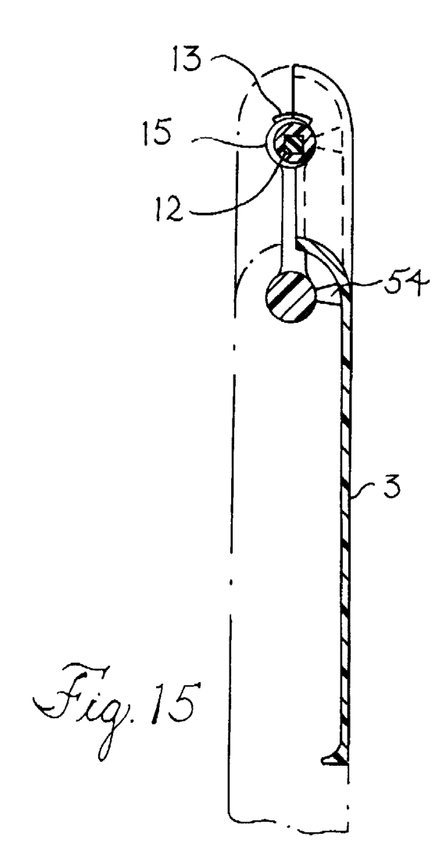
FIG. 15 shows a section C—C as indicated in FIG. 12.
Figure 16:
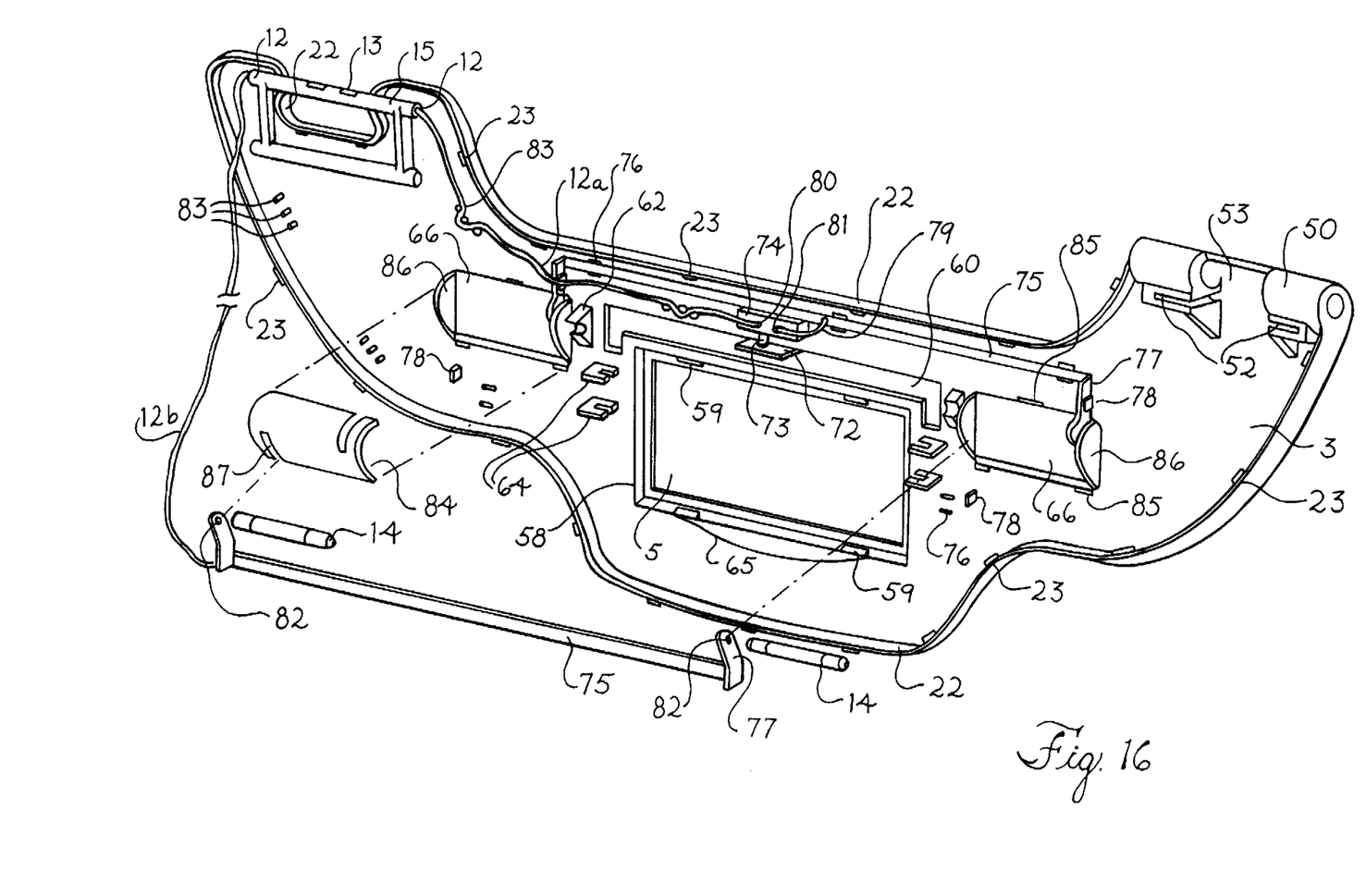
FIG. 16 shows a detail of the sun visor of FIG. 12, seen from the rear.
Figures 17, 18:
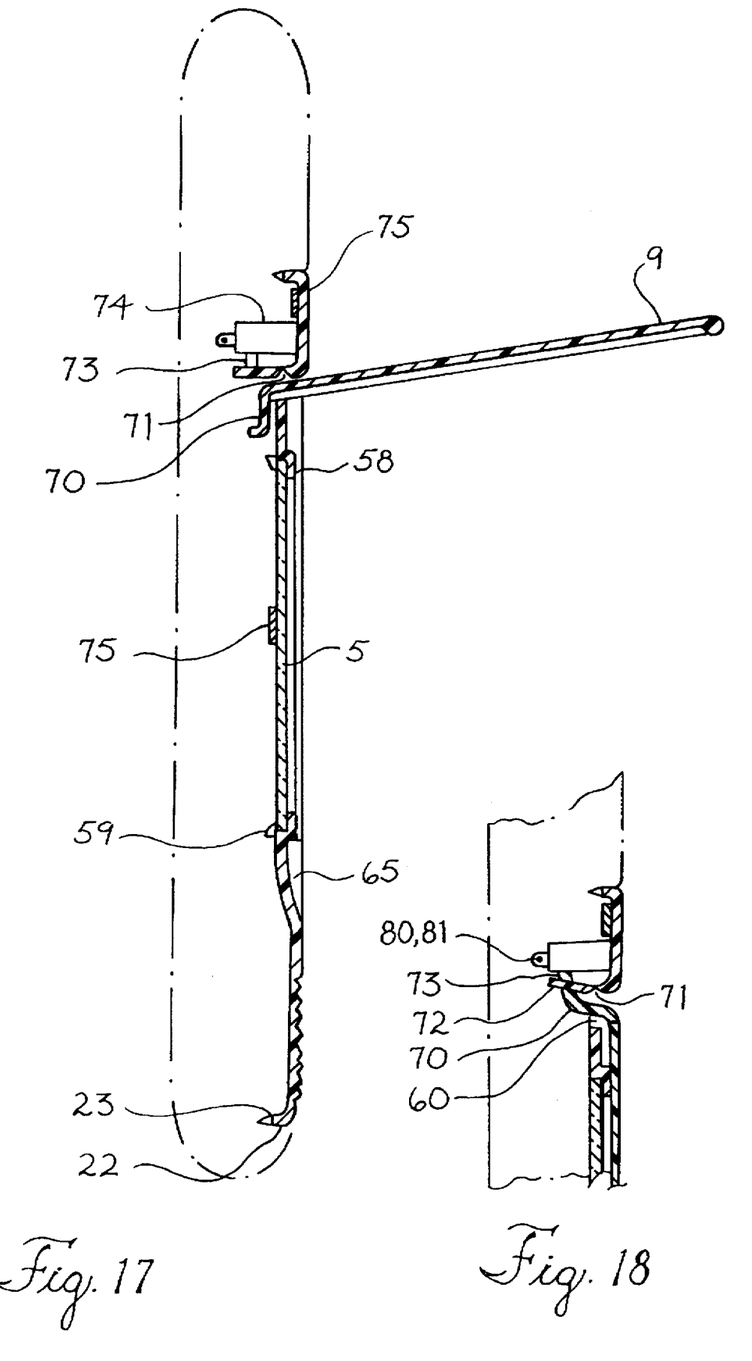
FIG. 17 shows a cross section through the sun visor body of FIG. 12 to 16 with the cover flap open.
FIG. 18 shows a portion of FIG. 17 with the cover flap closed.

Injection molded locally in place at center of the upper section of the cover flap 9 is an angled elevation 70 which during rotation movements of the cover flap 9 in the closed state presses on a web 72 joined locally with the carrier plate 2 by means of a film hinge 71. The tilting movement of the web 72 causes the switch button 73 of the microswitch 74 to be actuated by means of the elevation 70 at the cover flap 9, wherein the switch had previously been mounted on the rear surface of the carrier plate. The microswitch 74 switches on the illumination when the cover flap 9 is opened, whereas when the cover flap 9 is in its closed state, the illumination remains switched off, since the switch button 73 is placed under pressure by way of the elevation 70 at the cover flap 9 via the web 72.

Once the flap has been mounted, the two leaf springs 10 with the extended claws 68 are mounted. For this purpose, the two retaining webs 64 are injection molded in place at the left and right on the rear of the carrier plate. Now the two contact strips 75 can be mounted. They are clipped in place at the clip lugs 76 injection molded onto the rear of the carrier plate. The perpendicularly angled contact ears 77 at the contact strips 75 extend into the openings 66 which serve for the light emission for the illumination feature, whereby the support tabs 78 support the contact ears 77 at the side.

Now a cable 12a at the contact pin 12 is soldered to the soldering lug 80 of the microswitch 74 and the other cable 12b is joined to the second contact pin 12 of the second contact strip 75 by soldering. A short cable 79 forms a bridge by soldering to a soldering lug 81 at the microswitch 74 and the contact strip 75. The cables 12a, 12b are positioned and clamped in place by a stud 83 injection molded for this purpose on the rear of the carrier plate. Then two tubular lamps 14 are installed in the mounting hole 82 provided in the perpendicularly angled contact ears 77. The support tabs 78 avoid unintended bending or spreading of the contact webs 77. Now the two plastic reflectors 84 can be clipped in place from the rear of the carrier plate at the clip tongues 85 injection molded in place for this purpose, wherein the side panels 86 at the sides of the openings 66 serve to block light. The slots 87 formed in the plastic reflector 84 fit exactly over the vertical, angled contact webs 77. There follows the installation of the two illumination windows 88 at the clip tabs 89 in the openings 66 provided at the left and right, from the visible side of the carrier plate 2.

The carrier plate 2 is now, after its completion, pressed into the mounting recess 21 wherein the envelope material 20 which may be provided matches the recess 21. The upstanding raised lip 22 is then joined with the padding panel 1 by way of the locally upstanding welding tabs 23 by means of vibratory or ultrasonic welding. Then the sun visor shaft 16 is mounted in the bearing area provided for this purpose.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. In a vehicle sun visor, the sun visor body includes a main foamed plastic body panel having a recess in one surface thereof and a separate injection molded plastic carrier plate fitted into the recess, the recess being shaped for receiving the carrier plate; the carrier plate being smaller in size than the main body panel; the carrier plate being generally U-shaped, including one arm on which the bearing region for the sun visor shaft is supported and on which a spring for the detenting of the sun visor shaft is supported; and including another arm with an end support pin for supporting the sun visor body in the vehicle.

2. The sun visor of claim 1, further comprising a bearing mount on the carrier plate in the area of the bearing region, with the spring being so shaped and supported by the bearing mount as to press against the sun visor shaft for controlling the swiveling of the sun visor body around the sun visor shaft in the bearing region.

3. The sun visor of claim 1, wherein the carrier plate has a peripheral lip at its periphery and the lip having a free end which engages said surface of the main panel and is fixed thereto.

4. The sun visor of claim 1, further comprising an enveloping material over the main panel selected from the group consisting of plastic film, textile material and leather.

5. The sun visor of claim 1, wherein the main panel is of sufficient thickness and the recess in said surface thereof is of sufficient depth that the depth of the recess corresponds to the thickness of the carrier plate in the recess.

6. The sun visor of claim 1, wherein the carrier plate includes a peripheral lip having a free end placed so that the lip engages the material of the main panel in the recess.

7. The sun visor of claim 3, wherein the lip is provided with welding studs distributed along the lip and engaging the main panel material, and the welding studs are welded to said surface of the main body panel.

8. The sun visor of claim 1, wherein the end support pin is a separate component which is attached to the carrier plate.

9. The sun visor of claim 1, wherein the carrier plate has a web joining the arms, the web being shaped for defining a recess therein for selectively receiving a mirror and a ticket clip.

10. The sun visor of claim 9, further comprising a mirror located in the recess in the carrier plate.

11. The sun visor of claim 10, wherein the mounting recess in the carrier plate includes an opening therein, a carrier frame in the opening, the mirror being in the opening surrounded by the carrier frame, the opening permitting the mirror to be installed from the second surface of the carrier plate; tabs on the carrier frame for supporting the mirror therein.

12. The sun visor of claim 10, further comprising a plastic frame in the recess in the carrier plate and the mirror being held in the plastic frame.

13. The sun visor of claim 12, further comprising a cover flap for the mirror and a hinge attached to the frame for swingably attaching the cover flap to the frame, so that the cover flap may be moved to cover the mirror.

14. The sun visor of claim 13, wherein the recess for the mirror is shaped to make a transition to a finger tip recess for facilitating an actuation of the cover flap.

15. The sun visor of claim 13, further comprising a slot opening in the carrier plate above the recess for the mirror and including downwardly directed extensions at the ends of the slot in the carrier plate for receiving the cover flap;

the cover flap including a portion thereof which passes through the slot opening; the cover flap having an upper edge with hinge pins projecting therefrom; mounting bearings formed on the carrier plate in which the hinge pins of the cover flap are received, whereby the cover flap may hingedly swivel.

16. The sun visor of claim 15, further comprising over center segments formed on the cover flap in the vicinity of the hinge pins; springs at the carrier plate pressing against the over center segments for holding the cover flap selectively in the open or closed position thereof.

17. The sun visor of claim 1, wherein the carrier plate has at least one window like opening formed therein which is closable by a covering element; the main body panel having a respective second opening behind the first opening in the carrier plate for the purpose of accepting a construction element.

18. The sun visor of claim 17, further comprising a cover element in the form of a cover cap for being disposed over the window like opening.

19. The sun visor of claim 18, wherein the cover element includes detent tabs for clip mounting to the carrier plate.

20. The sun visor of claim 18, wherein the cover element comprises a plate comprised of translucent material and fitted with clip tabs for clip mounting to the carrier plate.

21. The sun visor of claim 20, further comprising electrical illumination means at the carrier plate, the illumination means comprising a tubular lamp disposed behind the cover element plate, contact elements leading to the tubular lamp, contact wires from the contact elements and a switch connected to an electrical power supply of the vehicle, the switch being operable for operating the lamp.

22. The sun visor of claim 17, further comprising electrical illumination means located at the openings in the main panel and the carrier plate, a switch connected with the illumination means and the switch being connectable with an electrical power supply of the vehicle to be operable for operating the illumination means.

23. The sun visor of claim 22, wherein the carrier plate includes a slot opening therethrough above the cover flap; the cover flap includes an angled elevation thereof directed to the rear of the cover flap and disposed through the slot in the carrier plate;

a web of the carrier plate above the opening thereof engagable by the angled elevation when the cover flap is in the closed condition over the mirror and disengaged from the angled elevation when the cover flap is upraised off the mirror;

a switch, including a switch button located above the web at the second surface of the carrier plate such that the switch is operated to operate or stop operation the illumination means depending upon the engagement between the angled elevation of the cover flap and the web at the switch.

24. The sun visor of claim 22, wherein the carrier plate further supports an end support pin at a location away from the bearing region, and the pin is adapted for being received in a support for the sun visor body.

25. The sun visor of claim 24, wherein the end support pin on the carrier plate includes a contact element thereon for making contact with an electrical system of the vehicle in which the sun visor is mounted, a conductor wire from the support pin leading to illumination means.

26. The sun visor of claim 25, wherein the end support pin is a separate component which is held to the carrier plate.

27. The sun visor of claim 9, wherein the carrier plate includes an extension web approximately at the center of the web of the carrier plate and extending nearly to the lower edge of the main panel for serving as a grip area.

\* \* \* \* \*